United States Patent
Abe et al.

(10) Patent No.: US 9,659,029 B2
(45) Date of Patent: *May 23, 2017

(54) FILE SYSTEM IMPLEMENTING WRITE ONCE READ MANY (WORM)

(71) Applicant: International Business Machines Corporation, Armonk, NY (US)

(72) Inventors: Atsushi Abe, Kanagawa-ken (JP); Takashi Ashida, Kanagawaken (JP); Takeshi Ishimoto, Kanagawaken (JP); Setsuko Masuda, Toshima-ku (JP); Yutaka Oishi, Kanagawa (JP); Masahide Washizawa, Kanagawa-ken (JP); Terue Watanabe, Setagaya-ku (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 192 days.

This patent is subject to a terminal disclaimer.

(21) Appl. No.: 14/517,076

(22) Filed: Oct. 17, 2014

(65) Prior Publication Data
US 2015/0120741 A1    Apr. 30, 2015

Related U.S. Application Data

(63) Continuation of application No. 14/491,208, filed on Sep. 19, 2014.

(30) Foreign Application Priority Data

Oct. 24, 2013  (JP) .................................. 2013-221185

(51) Int. Cl.
G06F 17/30   (2006.01)
G06F 21/00   (2013.01)

(52) U.S. Cl.
CPC .. *G06F 17/30188* (2013.01); *G06F 17/30076* (2013.01); *G06F 21/00* (2013.01)

(58) Field of Classification Search
CPC combination set(s) only.
See application file for complete search history.

(56) References Cited

U.S. PATENT DOCUMENTS 5,745,458 A * 4/1998 Oliver .................... G11B 19/20
                                                      369/53.28
7,155,460 B2  12/2006 McGovern et al.
(Continued)

FOREIGN PATENT DOCUMENTS

JP    2006228056 A    8/2006
JP    2006524392 A    10/2006
(Continued)

*Primary Examiner* — Shyue Jiunn Hwa
(74) *Attorney, Agent, or Firm* — Garg Law Firm, PLLC; Rakesh Garg; Damion Josephs

(57) ABSTRACT

The embodiments deal with files that are already present in a storage when mounting the storage in a file system and files created after the mounting as different groups. (Metadata of) the files is classified. The files are each divided into metadata (index) and a file main body and are recorded on different storage areas, that is, an index partition (IP) and a data partition (DP), associated with each other. This file system is effective in a storage format in which a new file is merely written and an already written file is not updated or deleted (for example, a tape medium used in the LTFS). The embodiments implement a WORM file system by rejecting a request to update or delete a file that is present at mounting as a WORM file and permitting update or deletion of a file that is created after mounting until the storage is unmounted.

7 Claims, 6 Drawing Sheets

(56) References Cited

U.S. PATENT DOCUMENTS

| | | | | |
|---|---|---|---|---|
| 2008/0172563 A1* | 7/2008 | Stokes | ................... | G06F 21/80 |
| | | | | 713/193 |
| 2011/0191305 A1* | 8/2011 | Nakamura | ........... | G06F 3/0608 |
| | | | | 707/692 |

FOREIGN PATENT DOCUMENTS

| JP | 2006338345 A | 12/2006 |
|---|---|---|
| JP | 2008033517 A | 2/2008 |

* cited by examiner

FIG. 1
(A)
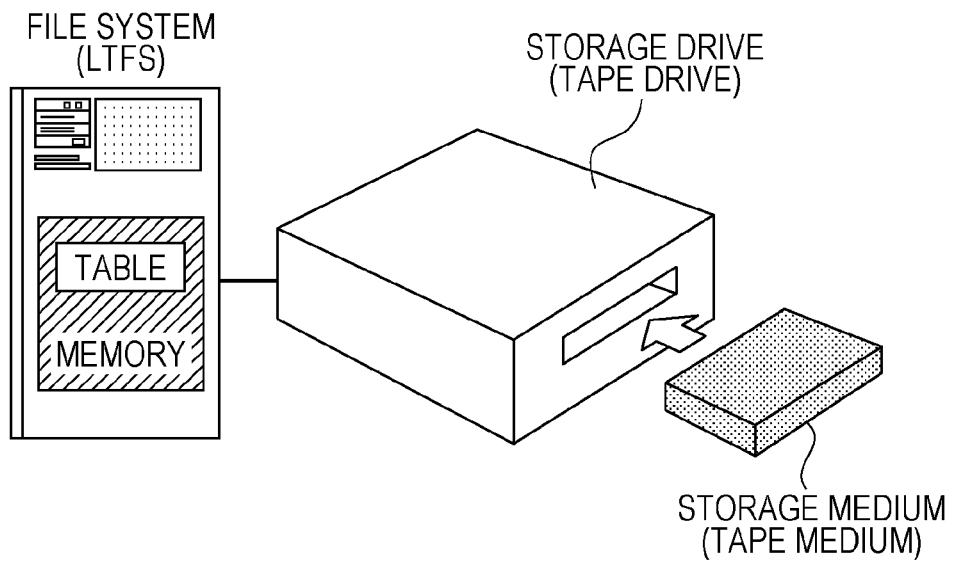
(B)
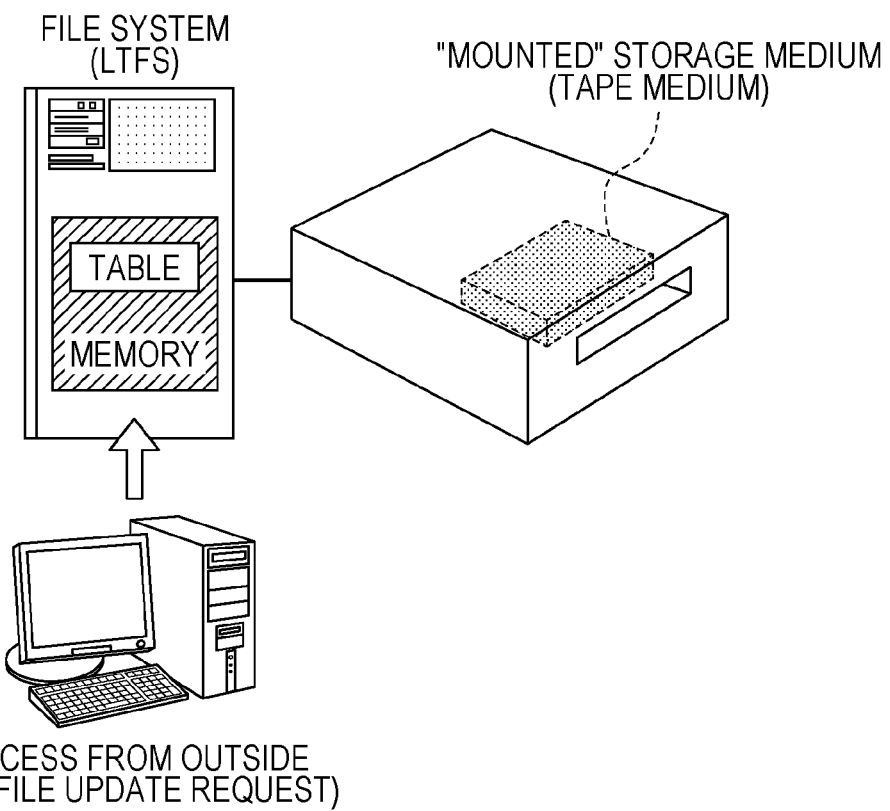

DATA STRUCTURE
(EXAMPLE CONFIGURATION OF TABLE)

| WORM GROUP IN WHICH UPDATE OR DELETION OF FILE IS REJECTED (FIRST GROUP) | R/W GROUP IN WHICH UPDATE OR DELETION OF FILE IS PERMITTED (SECOND GROUP) |
|---|---|
| INDEX INCLUDING METADATA OF FILE 1 AND FILE 2 ⋮ | INDEX INCLUDING METADATA OF FILE 3<br>INDEX INCLUDING METADATA OF FILE 4<br>INDEX INCLUDING METADATA OF FILE 5 ⋮ |

FIG. 7

MUTUAL RELATIONSHIP BETWEEN FILE TYPE AND MEDIUM TYPE

|  | R/W MEDIUM | WORM MEDIUM |
|---|---|---|
| R/W FILE | R/W FILE WRITTEN TO R/W MEDIUM: FILE CAN BE UPDATED/DELETED. USED MEDIUM CAN BE FORMATTED FOR REUSE. AFTER FORMATTING, FILE WRITTEN BEFORE FORMATTING CANNOT BE READ. | R/W FILE WRITTEN TO WORM MEDIUM: FILE CAN BE UPDATED/DELETED, BUT USED MEDIUM CANNOT BE FORMATTED. FILE BEFORE UPDATE/DELETION CAN BE READ BY TRACING HISTORY OF INDEX WRITTEN TO DP. (READ PROTECTION IS DISABLED) |
| WORM FILE | WORM FILE WRITTEN TO R/W MEDIUM: UPDATE/DELETION OF FILE IS REJECTED, BUT USED MEDIUM CAN BE FORMATTED FOR REUSE. AFTER FORMATTING, FILE WRITTEN BEFORE FORMATTING CANNOT BE READ. | WORM FILE WRITTEN TO WORM MEDIUM: UPDATE/DELETION OF FILE IS REJECTED, AND USED MEDIUM CANNOT BE FORMATTED. |

FILE SYSTEM IMPLEMENTING WRITE ONCE READ MANY (WORM)

The present application is a continuation nonprovisional application claiming the priority of the filing date of the co-pending and commonly assigned U.S. patent application Ser. No. 14/491,208 entitled "FILE SYSTEM IMPLEMENTING WRITE ONCE READ MANY (WORM)," filed on Sep. 19, 2014.

TECHNICAL FIELD

The present invention relates to a file system implementing write once read many (WORM) (hereinafter referred to as "WORM file system".

BACKGROUND ART

Examples of tape media that, e.g. an LTO tape drive and an IBM™ enterprise tape drive TS1140 use include general tape media, called R/W media, and also WORM media in which data, once written, cannot be erased, in other words, which is used like a CD-R.

The tape drives have the function of detecting tampering of data written to a WORM medium, committed by a malicious third person, when reading the data.

IBM™ has developed a file system that operates on a tape device, named a linear tape file system (LTFS).

Some versions can be downloaded from the Web without charge, and some other versions are priced and are on the market on a chargeable basis.

The LTFS is an open standard system; a plurality of companies do business using products based on the LTFS standard.

When a tape medium is to be used in the LTFS, the tape medium is divided into two partitions called an index partition (IP) and a data partition (DP).

When a user writes a new file on a tape medium using the LTFS, the data partition (DP) is mainly used as an area for storing a file main body, and the index partition (IP) is mainly used as an area for storing an index, to which metadata called an index is written.

The index has metadata of the file, such as file name and file creation date.

The index partition (IP) is a partition to which the latest index is typically written.

The data partition (DP) is a partition to which the file main body and also the history of the index are typically written.

Assuming that the present LTFS is used on WORM media, files recorded on the WORM media (including a directory, ditto for below) can be tampered or deleted, although data recorded on the WORM media cannot be deleted.

This is because tampering or deletion of files in the LTFS is performed by additionally writing a file main body or metadata without involving deletion of data recorded on the WORM media.

Example related art for achieving the WORM file system is as follows:

Patent Literature 1 discloses a technique for a WORM file system that rejects tampering or deletion of not only a bit array stored in a storage but also a file itself on a WORM medium.

The title is "Write-once-read-many storage system and method for implementing the same".

Patent Literature 1 discloses a system in which an attribute, WORM bit, is prepared to implement WORM for each file, and in which update/deletion of files is enabled before the WORM bit is turned on, and is rejected after the WORM bit is turned on.

The capacity of tape media is increasing year by year; for example, the capacity of JC tape media that TS1140 uses is 4 TB.

For using the LTFS, there is a need for writing a large amount of files with an average size of about 10 KB to a tape medium.

In particular, for storing a large amount of files in a tape medium, if bits for implementing WORM are to be prepared for each file, the time required to update the WORM bits and the volume of the WORM bits in the metadata cannot be disregarded.

If files with a file size of 10 KB are stored in a tape medium with a capacity of 4 TB, the number of files per tape medium is four hundred million. Assuming that the length of an attribute (<worm>0</worm>), including line feed code, for implementing WORM stored in XML is 15 byte, the volume of WORM bits in metadata when four hundred million files are present is 6 GB.

Furthermore, it takes 24 seconds to read or write the information from the tape medium at 250 MB/sec.

Patent Literature 2 discloses implementation of WORM for files and directories by explicitly executing a command for WORM, which differs from the present invention.

CITATION LIST

[Patent Literature 1] U.S. Pat. No. 7,155,460B2
Japanese Unexamined Patent Application Publication (Translation of PCT Application) No. 2006-524392 (Japanese translation of PCT international application claiming priority based on the U.S. patent application, a family application of the U.S. patent application)

[Patent Literature 2] Japanese Unexamined Patent Application Publication No. 2006-228056

SUMMARY OF INVENTION

An object to the present invention is to provide a write once read many (WORM) file system in which the problems of the time required for update and the volume in the related art are solved.

The present invention deals with files that are already present in a storage when mounting the storage in a file system and files created after the mounting as different groups.

The present invention implements a WORM file system by rejecting a request to update/delete files that are present at mounting as WORM files and permitting update/deletion of files that are created after mounting until the storage is unmounted.

According to the present invention, if 400,000,000 files are stored in a tape medium, the volume of indices can be reduced by 6 GB, and the time required to mount or unmount the tape medium to or from the file system can be reduced by 24 seconds, as compared with the related art, as described in Background Art.

BRIEF DESCRIPTION OF DRAWINGS

FIG. 1 is a diagram illustrating mounting of a storage medium.

FIG. 7 is a matrix showing the mutual relationship between file type and medium type according to an embodiment of the present invention.

DETAILED DESCRIPTION

FIG. 1 is a diagram illustrating mounting of a storage medium.

An example of the storage medium is a tape medium.

The storage medium is "mounted" in a storage drive.

An example of the storage drive is a tape drive.

In the present invention, a "mounted" state is a state in which the storage medium can be accessed from the outside.

Accordingly, the term "mounted storage" has technical meaning only for comparison with an unmounted storage and thus should be widely interpreted in this respect.

In the example of FIG. 1, the storage medium shifts from state (A) to state (B), bringing access to the tape medium to READY.

Actually, a desired recording portion in the tape medium is specified while the tape medium is physically wound, and writing is performed through a head provided in the tape drive.

In managing the index of a file, the LTFS in the related art has managed the index with a single data structure irrespective of whether the file is already present at mounting or created after mounting.

Figure 2:
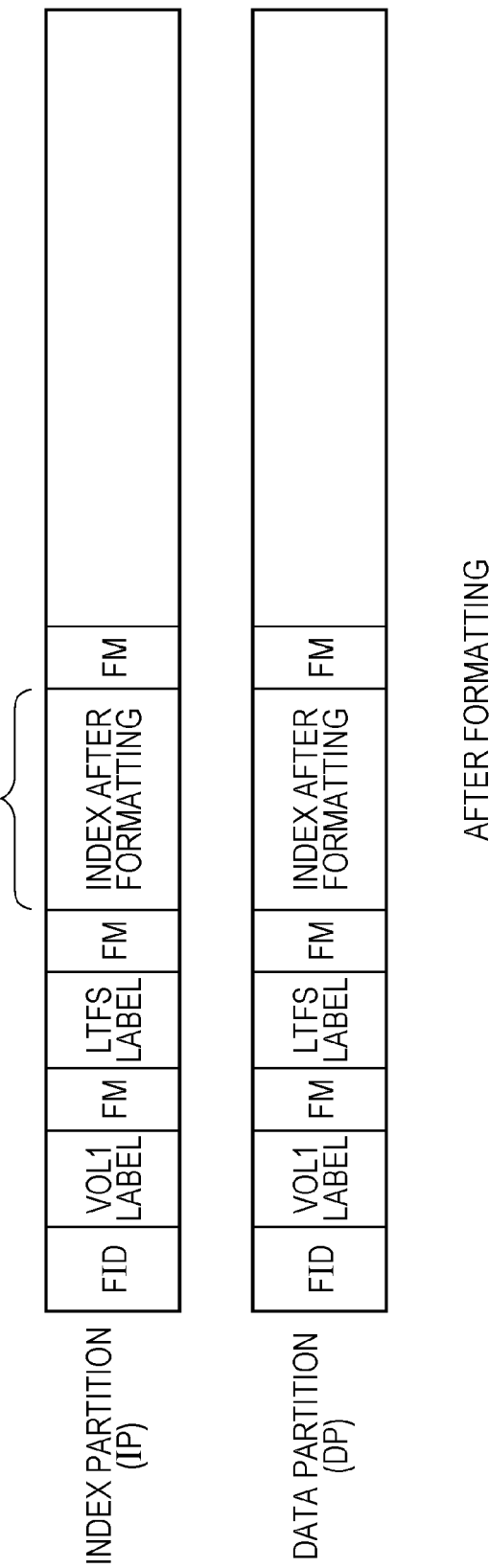
FIG. 2 is a schematic diagram illustrating a format of a tape medium divided into two partitions, called an index partition (IP) and a data partition (DP), for use in the LTFS.

FIG. 2 is a schematic diagram illustrating a format of a tape medium divided into two partitions, called an index partition (IP) and a data partition (DP), for use in the LTFS.

This shows a state after formatting, in which no file is written, and "index after formatting" is written.

Figure 3:
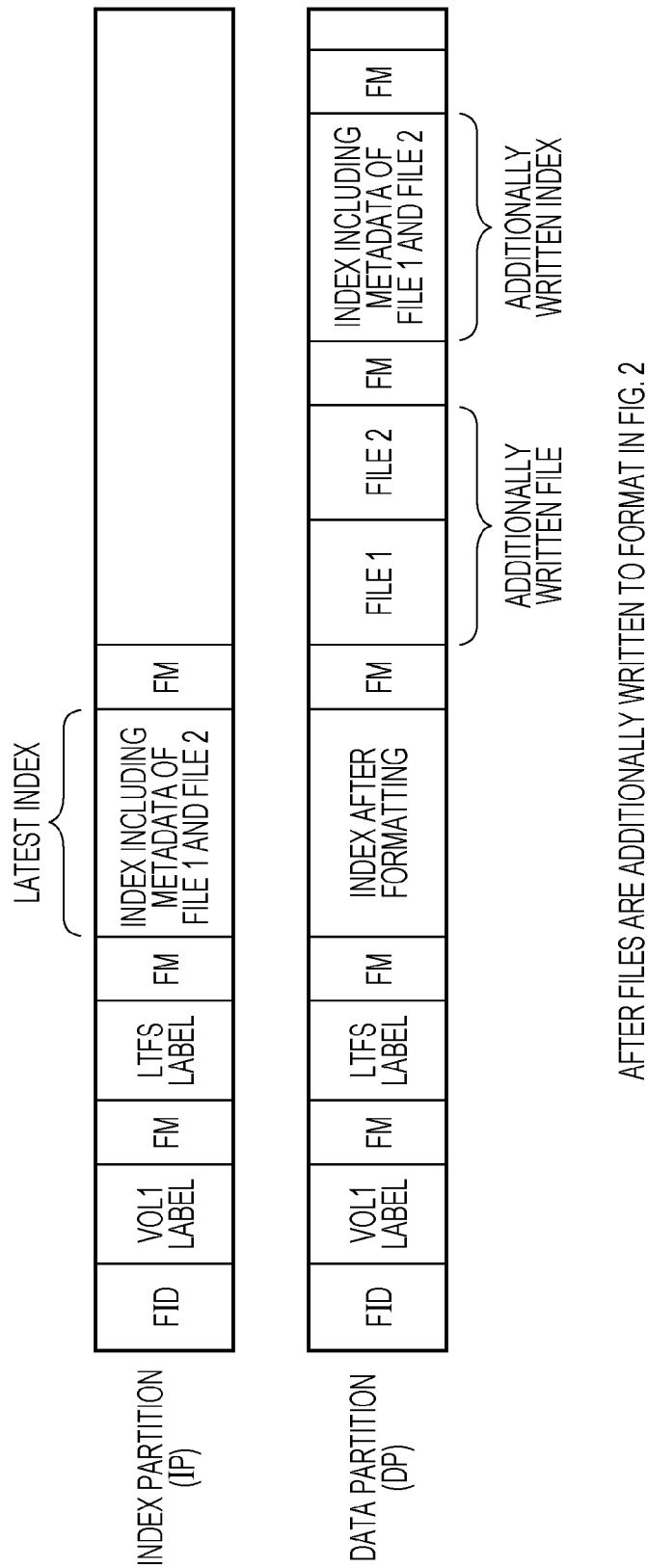
FIG. 3 is a schematic diagram illustrating a state in which new files are written to the format in FIG. 2.

FIG. 3 is a schematic diagram illustrating a state in which new files 1 and 2 are written to the format in FIG. 2.

"Index after formatting" in the partition (IP) is updated to an "index including metadata of file 1 and file 2" to change to "latest index".

However, note that the writing of the new files (file 1 and file 2) to the data partition (DP) is merely addition and that an already written file is not updated or deleted.

Here, although each file is divided into the metadata and the file main body of the file, they are recorded in association with each other.

Specifically, since not only "index after formatting" in the index partition (IP) is updated to "index including metadata of file 1 and file 2" to change to "latest index", but also "index including metadata of file 1 and file 2" is additionally written to the data partition (DP), the mutual relationship is kept recorded.

Such a storage format is an effective storage format for application of the present invention.

Figure 4:
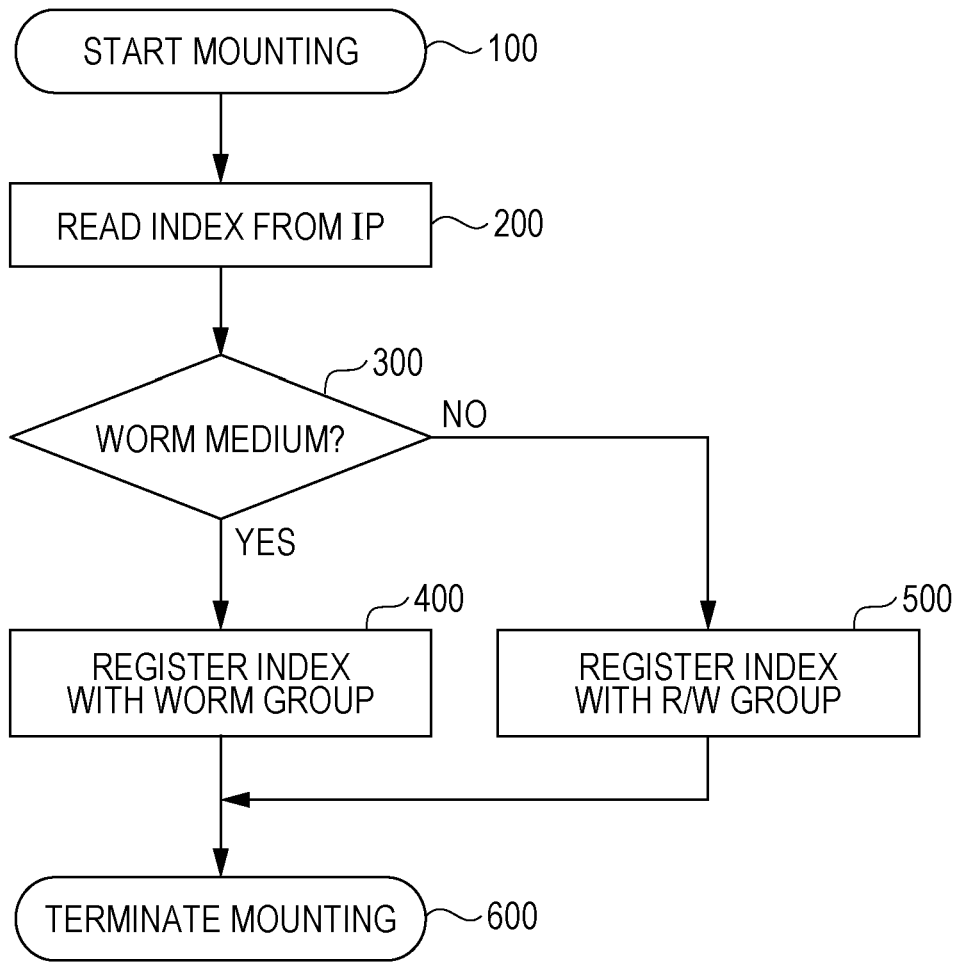
FIG. 4 is a flowchart for reading an index from the IP at mounting and storing the index into a data structure.

FIG. 4 is a flowchart for reading an index from the IP at mounting and storing the index into a data structure.

In step 100, mounting is started.

In step 200, an index of a file present in a mounted storage medium is read from the IP.

In step 300, it is determined whether the storage medium is a WORM medium or not.

If the determination result in step 300 is Yes, the metadata of the file determined to have been present in the storage medium before mounting is classified as a first group in which update or deletion of the file is rejected (as a WORM file) in step 400.

If the determination result in step 300 is No, the metadata of the file written after mounting is classified as a second group in which update or deletion of the file is permitted (as a R/W file) in step 500.

When the storage medium is mounted, all indices in the storage medium may be read, and such classification may be repeated for all the indices.

In step 600, the mounting is terminated. Indices of files created after mounting are always registered with the R/W group irrespective of whether the tape medium is a WORM medium or a R/W medium.

In the LTFS, since individual files have corresponding IDs numbered in the order of creation to increase uniquely, called UIDs, the data structure itself may be an integrated structure, so that it can be determined whether the individual files belong to the R/W group or the WORM group by comparing the values of the UIDs of the files are greater than the largest UID at mounting.

In the present invention, the data structure in which indices are managed is divided into two data structures of the WORM group and the R/W group (for example, a hash table).

Figures 5, 6:
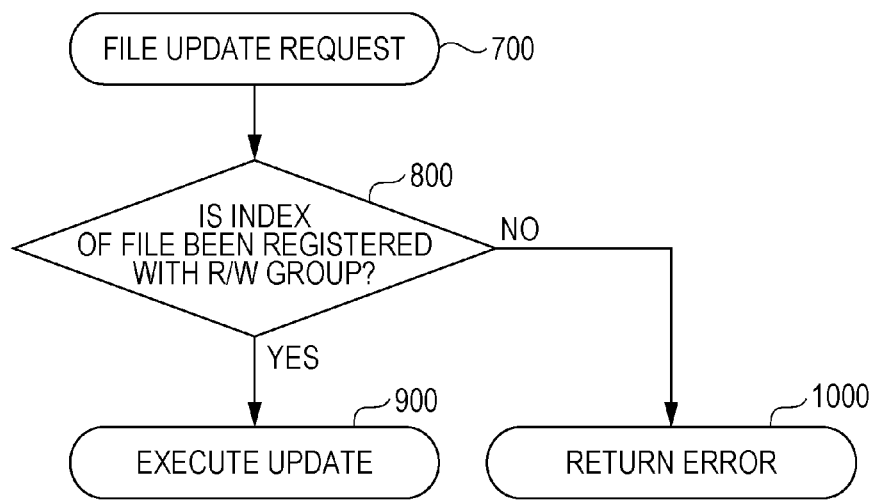
FIG. 5 is a diagram illustrating a data structure (table) according to an embodiment of the present invention.
FIG. 6 is a flowchart for processing write access to a mounted storage medium from the outside.

FIG. 5 is a diagram illustrating a data structure (table) according to an embodiment of the present invention.

The result of classification according to the flowchart in FIG. 4 may be stored in the memory in the file system (FIG. 1) in the form of the data structure (table).

Of course, the result may be stored not only in the file system but also a table (not shown) connected to the file system.

The classified data structure also presents a characteristic of the present invention.

FIG. 6 is a flowchart for processing write access to the mounted storage medium from the outside.

In step 700, a file update request, e.g. addition, update, and deletion of data of a file, and update of metadata of the file (e.g. file name) are given.

In step 800, it is determined whether the index of the file is registered with the R/W group.

If the index is registered with the R/W group, change/deletion is permitted in step 900 as before.

In contrast, if the index of the file is registered with the WORM group, change/deletion is rejected in step 1000, and an error is returned.

Addition of a file/directory to the directory is permitted irrespective of a group with which the directory is registered.

A change in directory name and deletion of a directory are permitted if the index of the directory is registered with the R/W group as before.

If the index of the directory is registered with the WORM group, a change of the directory name and deletion of the directory itself are rejected, and an error is returned.

Application of the present invention allows a WORM file system to be constructed without adding new information to the index.

Assuming that 400,000,000 files are stored in a tape medium, the volume of the indices can be reduced by 6 GB, and the time required to mount or unmount the tape medium to or from the file system can be reduced by 24 seconds, as compared with the related art, as described in Background Art.

An embodiment of the present invention has been described on the basis of the LTFS.

However, it is apparent to those skilled in the art that the present invention can be applied not only to the LTFS but also to any file system.

The present invention can be embodied not only as the category of a method but also as a computer program for implementing the method.

FIG. 7 is a matrix showing the mutual relationship between file type and medium type according to an embodiment of the present invention.

The invention claimed is:

1. A method for a file system to classify files in a mounted storage in a storage format in which the files are each divided into metadata and a file main body and are recorded in association with each other, and in which a new file is merely written, and an already written file is not updated or deleted, the method comprising:
    making a first determination whether a file present in the mounted storage has already been present in the storage when the storage is mounted;
    classifying, responsive to the first determination being affirmative, using a processor and a memory, the file as belonging to a first group as a Write-Once-Read-Many (WORM) file;
    rejecting, responsive to the file belonging to the first group, at least one of an update and a deletion of the file;
    classifying, responsive to the first determination being negative, when the file is written after the mounting, the file as belonging to a second group as a Read/Write (R/W) file;
    permitting, responsive to the file belonging to the second group, at least one of the update and the deletion of the file;
    making a second determination, when the mounted storage is accessed for a write operation from outside a data processing system where the storage is mounted, that an access target belongs to the first group, the access target including the file;
    rejecting by the file system, responsive to the second determination, at least one of the update and the deletion of the file;
    making a third determination, when the mounted storage is accessed from outside the data processing system, that an access target belongs to the second group, the access target including the file; and
    permitting by the file system, responsive to the third determination, at least one of the update and the deletion of the file.

2. The method according to claim 1, wherein
when the storage is mounted, all indices corresponding to all files in the storage are read, and the rejecting and the permitting are executed for all the indices.

3. The method according to claim 2, further comprising:
storing a result of the classifying the file as belonging to the first group and a result of the classifying the file as belonging to the second group in a table coupled to the file system.

4. The method according to claim 3, wherein
the table is a hash table.

5. The method according to claim 1, further comprising:
executing the making depending on whether an identifier of the file is greater than a largest identifier at mounting, the identifier being recorded on the index and numbered in an order of creation.

6. The method according to claim 1, wherein
the mounted storage is a tape medium.

7. The method of claim 1, wherein the classifying responsive to the first determination being negative comprises classifying the metadata of the file, and the at least one of the update and the deletion of the file comprises at least one of an update and a deletion of the metadata of the file.

* * * * *